United States Patent Office 3,241,014
Patented Mar. 15, 1966

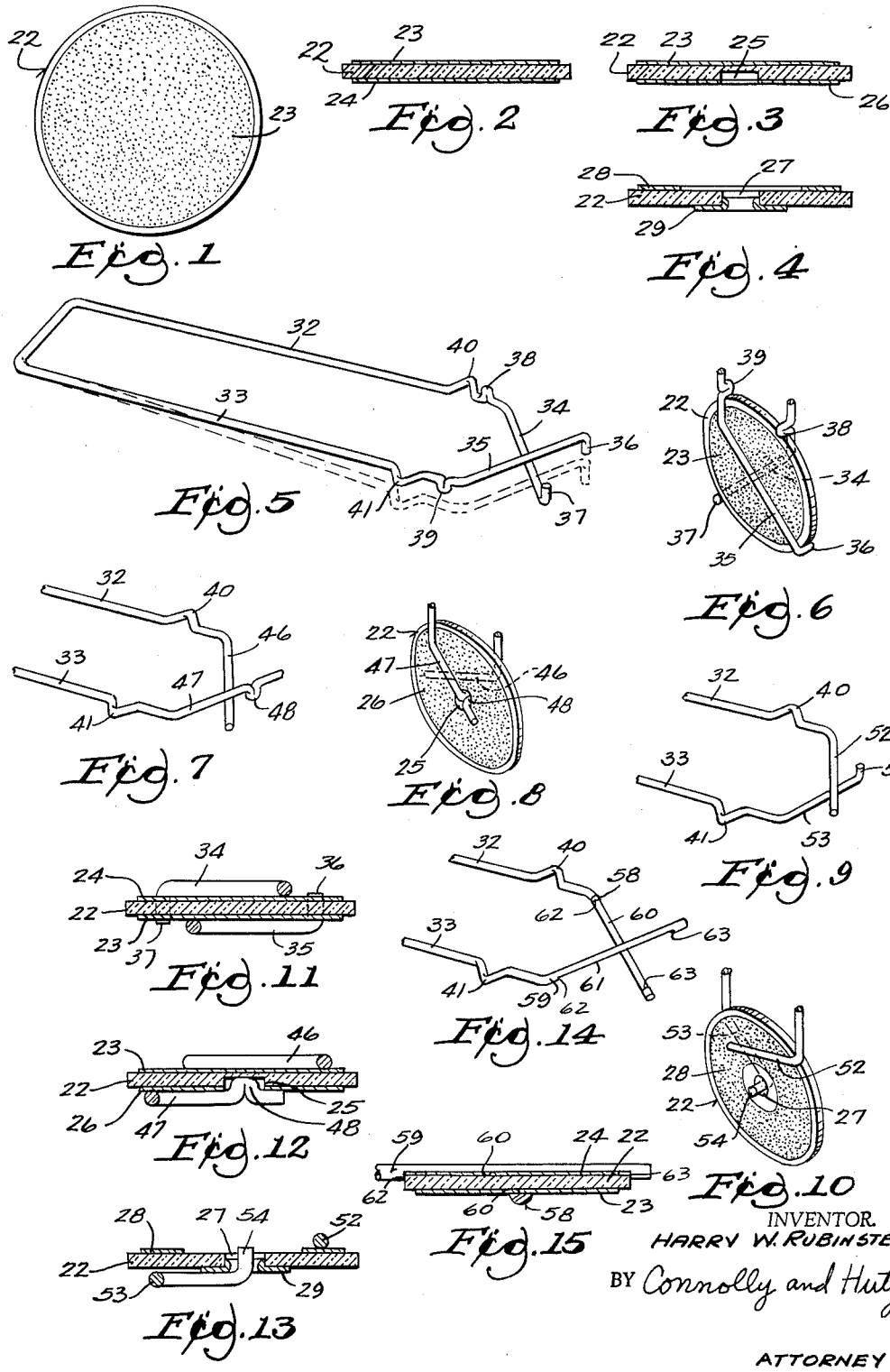

3,241,014
ELECTRICAL CAPACITOR
Harry W. Rubinstein, Fox Point, Wis., assignor to Sprague Electric Company, North Adams, Mass., a corporation of Massachusetts
Filed Dec. 9, 1964, Ser. No. 417,089
7 Claims. (Cl. 317—242)

This invention relates to improvements in an electrical device comprising a body such as a dielectric and wire electrical terminals, in which the terminals are formed to retain the body during handling of the assembled parts in air and upon attachment of the terminals thereto. The body is located in given relation to the terminals so that mounting stops can be pre-formed in the wire whereby the stops will be at the correct distance from the body for mounting the device.

When electrical devices such as capacitors of the ceramic body type, resistors, thermistors and the like are to be manufactured in quantity, the parts should be capable of assembly by machine. Machine assembly requires that the terminals receive and hold the body during manufacture of the device, and that the terminals may be attached to the held body as by immersion in solder by use of epoxy adhesives or the like to conductive coatings or the like, on the body in given relation without need for hand work to orient one part relative to another. For example, the terminal wire is usually somewhat resilient and is initially formed in U-shape and bent to provide crossed leg portions toward the free ends of the wire. If the wires are also bent at right angles near the free ends thereof, the two crossed wire legs will receive and engage the body at two points so spaced on a body surface that the assembled wire and body can be handled in air. However, when a ceramic is held only along one side, it may float upward from between the wires when it is dipped into molten solder with the holding bends lowermost in the solder. Hence such terminal holding bends must prevent body movement relative to the terminals, in different directions when in air and when immersed in molten solder.

A body may be more precisely located and held if the body has a socket in the side and a bend in a wire is seated in the socket. In one form of capacitor, e.g. a center socket or a hole may be provided in a ceramic body and a part of one conductive coating may extend around or into the hole from one side of the ceramic for engagement by one bend of a terminal while the other terminal is left unbent and bears on a second conductive coating on another face of the ceramic. Such capacitors are especially suitable for extremely low capacitance values which are required in electronic circuits such as the VHF and UHF circuits in television receivers. Such circuits are usually printed on boards with apertures to receive the leads of various electrical devices. It is desired that the terminals of devices to be mounted thereon, be formed with stops limiting insertion of the terminals into the circuit board and thereby placing the devices in a given position within quite close limits.

A somewhat resilient wire terminal piece is bent to a deep U-shape and end leg portions of the wire are bent to cross one another and provide one leg portion for bearing on one coating and another leg portion for bearing on another coating and for engaging a surface of or extending into a hole or socket in the body. The wire is given a pre-set so that the cross leg portions of the wire press toward one another and bear on the body during assembly of the capacitor. Both terminal leg portions are bent to an angle with the remainder of the wire to engage a surface of the body or the one wire leg may be formed to extend into the body hole or socket to position the crossed portions relative to the body. If very thin dielectric is used, the wire terminals may be pressed to form a notch in opposite sides of each terminal and of a length to receive the ceramic with little space for movement of the ceramic within the notch. When two opposite notches engage opposite sides of a ceramic, the two shoulders of each of the notches act to restrain movement of ceramic in either direction along the leads.

Because the present terminals are formed to locate the body in given position relative to the terminals, mounting stops can now also be pre-formed at opposite locations in the leads at a given distance from a surface of the completed device. The stops may be in the form of loops and determine the distance to which the round terminal ends can be inserted into a printed circuit mounting board. The forming of bends, notches or stops are readily accomplished by modifications of machines now in use for forming wire terminal pieces.

In the present application, "bends" designates a terminal leg portion engageable with the body to locate the same relative to the terminal, "socket" designates either a cavity or a notch formed in the body or a hole formed through the body for engagement by a terminal bend, and "stops" designates any formation of the terminal legs or addition thereto serving to limit insertion of the terminals into apertures for mounting the device in use.

In the drawings:

FIG. 1 is a plan view of one side of a ceramic disc having a conductive coating thereon located inwardly from the outer disc edge;

FIG. 2 is a cross section of a ceramic disc, having coatings thereon on opposite sides of the disc to form a capacitor;

FIG. 3 is a cross section of a ceramic disc capacitor similar to FIG. 2, but with a cavity formed approximately centrally therein;

FIG. 4 is a cross section of a ceramic disc, with a substantially central hole therethrough, the conductive coating on one side of the ceramic being in annular form and terminating an appreciable distance from the center hole, and the other conductive coating being in and about the center hole;

FIG. 5 is a perspective view of a terminal wire piece formed with end and intermediate bends to locate a piece of ceramic therebetween, and formed with stops for regulating the mounted position of the finished article;

FIG. 6 is a perspective view of a coated ceramic such as shown in FIG. 2, engaged by a terminal piece such as is shown in FIG. 5;

FIG. 7 is a perspective of a wire terminal piece with a bend adjacent the end of one terminal for entry into a socket in a dielectric such as shown in FIG. 3;

FIG. 8 is a perspective view of the terminal of FIG. 7 with its bend engaged in the socket in the coated ceramic shown in FIG. 3;

FIG. 9 is a perspective view of a wire terminal piece showing one end bend for extension through a central hole such as shown in FIG. 4;

FIG. 10 is a perspective view of the terminal piece of FIG. 9 with its end bend engaging in the center hole of a coated ceramic such as shown in FIG. 4;

FIGS. 11, 12 and 13 are respectively cross sections of FIGS. 6, 8 and 10.

FIG. 14 is a perspective view of a wire terminal piece having opposite notches formed in each wire adjacent one end and with notched ends of the wires crossing one another; and FIG. 15 is a cross section of a coated ceramic piece seated in and held by the notches shown in FIG. 14.

Capacitors have been illustrated in the drawing only as one embodiment of an electrical device in which wire terminals are to hold and position a dielectric body relative to the terminals, while the device is being manufactured, and in which such positioning is sufficiently accurate to allow the pre-forming of stops in the wire terminals which will determine the positioning of the device when in use.

Referring to the various parts shown in FIGS. 1 and 2 by numerals, a disc-shaped dielectric body 22 has conductive coatings 23, 24 on two faces thereof as required to obtain a desired capacitance value. The dielectric may, of course, be of any desired shape and the conductive coatings may be of any desired area and opposite one another or offset from one another as is well known. Another capacitor body 22 is indicated in FIG. 3 in which a cavity 25 is formed centrally of the device, the one conductive coating 26 then being of less area than the corresponding coating in FIGS. 1 and 2. FIG. 4 illustrates a capacitor in which the dielectric 22 has a central aperture 27 therethrough in place of the cavity 25 of FIG. 3. Inasmuch as both the cavity 25 and the aperture 27 perform the same mechanical function of positioning the terminals relative to the dielectric, the word "socket" is used below to designate both the cavity 25 and the aperture 27 or a notch or the like in the body.

In FIG. 4, one conductive coating 28 is annular and extends inwardly from the periphery of the dielectric 22 while the other coating 29 is located in and about the central socket 27 and extends outwardly toward the edge of the coating 28 but does not overlap such coating. The coatings 28, 29 accordingly provide a very low capacitance value because the line of electrical force acting between the coatings have long paths in the dielectric rather than the short paths available in FIGS. 2 and 3. Whether or not the coating 29 extends into the socket 27 and the degree of such extension depends on the capacity required as is well known.

A somewhat resilient wire terminal piece is formed as shown in FIG. 5 in which legs 34, 35 respectively become the terminals for the coatings 23, 24 shown in FIG. 2. The resilience of the wire is indicated by dotted lines in FIG. 5 and the end portions 34, 35 of the legs are bent to cross and to bear on one another. Ends 36, 37 of the crossed leg portions are bent at right angles thereto and extend toward one another and engage the edge of the coated ceramic at two points spaced approximately 90° as shown in FIG. 6, the leg portion 35 bearing on coating 24 and the leg portion 34 bearing on coating 23 as shown in FIG. 11, and being soldered thereto. Each of the terminal legs 32, 33 is also formed with a bend 38 or 39 at such spacing from the end bends 36 and 37 respectively as to receive in the space therebetween, the capacitor parts 22–24, with some allowance for manufacturing variation in diameter of the body. Thus the capacitor parts 22–24 are held as shown in FIG. 6 in which the bends 36, 37 prevent dropping the piece 22–24 when it is being moved from one location to another in air and the bends 38, 39 prevent floating of the piece 22–24 when it is immersed in molten solder. Inasmuch as capacitor parts 22–24 are located within sufficiently close limits relative to the ends of the terminals 32, 33, the bends 40, 41 are formed in the respective legs to serve as stops determining the depth to which the terminals may be inserted in a mounting panel. The stops 40, 41 are formed when the balance of the terminal piece is being initially formed by machine, rather than only after the structure is completed when the thickness of insulation, etc., introduce errors into the location of the stops (relative to the body).

In FIG. 7 the terminals 32, 33 have crossed leg portions 46, 47 and a bend 48 is formed adjacent the end of the leg portion 47. The bend 48 is of a size to enter the cavity 25 of the body shown in FIG. 3 when the leg portion 47 bears on conductive coating 26 so that the bend plus the crossed leg portions 46, 47 locate the terminals relative to the coatings as shown in FIGS. 8 and 12. Because of such location of the terminal legs on the dielectric, the stops 40, 41 are again formed simultaneously with the initial forming of the balance of the terminal piece. The bend 48 holds the dielectric conductive-coated piece 22, 23, 25, 26 in position both against the action of gravity and against the possibility of floating free when the pieces are assembled with the terminals and immersed in molten solder. The position of the coated dielectric piece lengthwise of the terminal is obviously the only criterion in placing the stops 40, 41 and such stops can therefore be formed by machine when the terminal piece is being made.

Referring to FIGS. 14 and 15, the terminals 32, 33 have crossed leg portions 58, 59 and such portions are severally pressed to form notches 60, 61 of a length to receive a dielectric piece, there being sufficient clearance in the notches to compensate for manufacturing size variations in the dielectric. The notches are formed inwardly from opposite surfaces of the legs 58, 59 and each of the notches has end surfaces 62, 63, which are substantially at a right angle to the bottom surface of the notches, for engaging the edge of the dielectric piece. The present construction is particularly appropriate for thin dielectric 22 such as shown in FIG. 15, wherein the dielectric is not of sufficient thickness to receive a socket as shown in FIGS. 3 and 4. None of the material is removed in making notches 60, 61 as it is immaterial that the leg portions 58, 59 may no longer be circular in cross section.

It will be seen that the crossed leg portions in FIGS. 5, 6 and 14, 15 have surfaces adjacent the leg "bends" and adjacent the stops which engage the dielectrics at four points spaced around the periphery thereof as shown in FIGS. 11 and 15. Such pairs of surfaces on each leg prevent movement of the body from between the crossed leg portions unless sufficient force is used to overcome the resilience of the wire terminal piece. In FIGS. 7, 8 and 9, 10 the bend in one crossed leg portion engageable in the body socket (aperture), or notch prevents all lengthwise movement of the body relative to the terminals as shown in FIGS. 12 and 13. Hence the stops 40, 41 can be initially formed in the terminal piece in given relation to the crossed leg portions and the stops will be the same distance from a surface of the body in the finished device.

I claim:

1. In an electrical device, a substantially planar dielectric body, separate electrically conductive coatings on two faces of the body, and two wire terminals formed with crossed leg portions for individual bearing on and attachment to the coatings, the terminals also formed with stops for determining the position of the device upon mounting for use, at least one terminal leg portion has a bend engageable with the body for holding the body in a given relationship to the stops, the stops being spaced from a surface of the body in the completed device.

2. The electrical device of claim 1 in which at least one of the terminal crossed leg portions has the bend engageable with the body at substantially a right angle to the coatings thereof for holding the body in a given relationship to the terminals.

3. The device of claim 1 in which at least one of the terminal crossed leg portions has the bend adjacent to the portion thereof to be attached to the body coatings and for engagement with a surface of the body at substantially a right angle to the coating faces for holding the body in given relationship to the terminals.

4. The device of claim 1 in which the body has a socket therein and the bend in the terminal leg portion is of a size to enter into and engage in the socket.

5. The device of claim 1 in which the body has a hole substantially centrally of one coated body face and the bend in the terminal leg portion is of a size to extend through the hole in the body.

6. The device of claim 1 in which the crossed leg terminal portions each have plural faces at substantially a right angle to the length of the legs for engaging uncoated surfaces of the body and holding the body in given relationship to the crossed leg terminal portions.

7. The device of claim 1 in which the crossed leg terminal portions each have a notch and the notches are in opposite relationship and are of a size for coacting in receiving and holding the body in given relationship to the terminals.

References Cited by the Examiner

UNITED STATES PATENTS

| | | | |
|---|---|---|---|
| 986,854 | 3/1911 | Peck | 24—261 |
| 1,130,381 | 3/1915 | Cunningham | 24—261 |
| 2,766,510 | 10/1956 | Heibel | 317—242 |
| 2,830,698 | 4/1958 | Coda et al. | 317—242 |
| 3,002,137 | 9/1961 | Kahn et al. | 317—242 |
| 3,056,939 | 10/1962 | Rayburn. | |

JOHN F. BURNS, *Primary Examiner.*